H. T. STEPHENS.

PUNCTURE MENDING DEVICE.

APPLICATION FILED MAY 27, 1916.

Reissued Dec. 4, 1917. 14,405.

Inventor:
Hugh T. Stephens
by Foster Freeman Watson & Coit
Attys

UNITED STATES PATENT OFFICE.

HUGH TAYLOR STEPHENS, OF CARMARTHEN, WALES, ASSIGNOR TO MUSTIKON LIMITED, OF CARDIFF, WALES.

PUNCTURE-MENDING DEVICE.

14,405. Specification of Reissued Letters Patent. Reissued Dec. 4, 1917.

Original No. 1,131,745, dated March 16, 1915, Serial No. 737,597, filed December 19, 1912. Application for reissue filed May 27, 1916. Serial No. 100,407.

*To all whom it may concern:*

Be it known that I, HUGH TAYLOR STEPHENS, a subject of the King of England, residing at 4 Quay street, Carmarthen, in the county of Carmarthen, Wales, England, have invented a new and useful Puncture-Mending Device, of which the following is a specification.

This invention for improvement for repairing pneumatic tires and the like relates to patches of rubber or other flexible material adapted to mend the puncture both on the outside and inside and has for this object an improved construction of patch which will facilitate the application of the patch both to the outside and inside at the same time and cause the two parts to be held in position tightly against the sides of the tube or cover as the case may be.

Now according to this invention the patch is provided with an outer part or cup that projects upward from the connecting stem so that when the bottom part or head is in position on the inside of the tube the cup part remains on the outside ready to be stuck down. This cup-part is so molded where it joins the stem that when it is pressed down it tends to remain in that position and consequently when in use to draw the head up against the inside of the tube and thus prevent the air getting past the head as happens with others of somewhat similar device. The head is provided on its outer surface with a projection or templet of suitable thickness and contour which, when moistened and pressed against the tube, leaves a mark to be cut out to receive the stem. The patch may be treated with a suitable adhesive then inserted through the hole and drawn back into position by a pair of pliers when the outside part is now pressed down and the tire is ready for inflation. When used for outer covers the head may preferably be on the outside of the same in which case when the cup is flattened out on the inside the head will be pulled down on the outside. A strong layer of canvas is now stuck over the hollow cup—inside the cover to take the pressure of the air off the damaged part.

Similar letters refer to similar parts throughout the several drawings.

Figure 1:
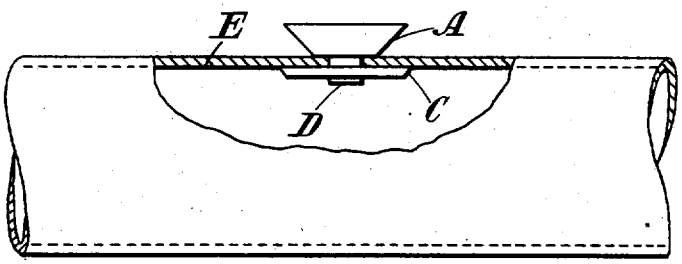
Figure 1 shows one of the patches or studs on position in the hole.
Figure 2:
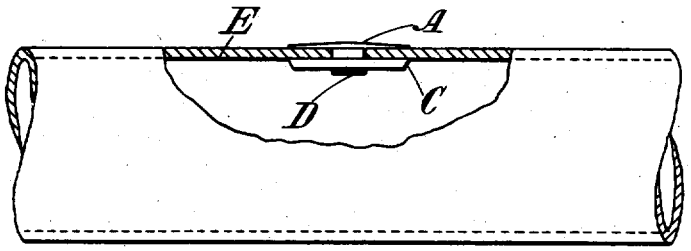
Fig. 2 shows one of the patches or studs in its closed or protective position.
Figure 3:
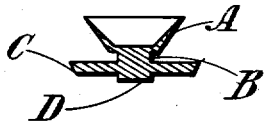
Fig. 3 shows one of the patches or studs in section.

In Fig. 1, A represents the cup shown outside the tube and not yet turned over. In Fig. 2, A represents the cup turned down on to the tube, C represents the head of the stud, and E is the tube in section while the stud itself is shown in elevation. Fig. 3, is a section of the stud, A being the cup, B being the stem, C being the head, and D the templet.

I am aware that prior to my invention other devices have been devised for a similar purpose. I therefore do not claim such a combination broadly, but

I claim:—

1. A tire-repair stud comprising a stem, a disk of flexible material on one end of said stem and a cup of rubber-like material on the other end of said stem, said cup being so molded that before application its hollow side faces away from the disk, but when turned down without permanent set being imparted to it, tends to remain in that position and consequently when in use will, owing to its resilience, draw the disk up against the inside of the tube.

2. A tire-repair stud comprising a rubber stem, a disk of resilient flexible material on one end of said stem, and a cup of resilient flexible material on the other end of said stem, said cup being so molded where it joins the stem that before application its hollow side faces away from the disk but when turned down it tends to remain in that position and consequently when in use tends to draw the disk up against the inside of the tube.

3. A tire-repair stud comprising a rubber stem, a rubber disk at one end and integral therewith, and a rubber cup at the other end also integral therewith, the said cup being so molded where it joins the stem that before application its hollow side faces away from the disk but when turned down it tends to remain in that position and consequently when in use tends to draw the disk up against the inside of the tube.

HUGH TAYLOR STEPHENS.

Copies of this patent may be obtained for five cents each, by addressing the "Commissioner of Patents, Washington, D. C."